Feb. 25, 1958

W. J. WHITEHEAD 2,824,549

COMPENSATED SPEED GOVERNOR

Filed Nov. 17, 1955

INVENTOR
Willard J. Whitehead
By Carlson, Pitzner, Hubbard & Wolfe
ATTORNEYS

Feb. 25, 1958
W. J. WHITEHEAD
2,824,549
COMPENSATED SPEED GOVERNOR
Filed Nov. 17, 1955
2 Sheets-Sheet 2
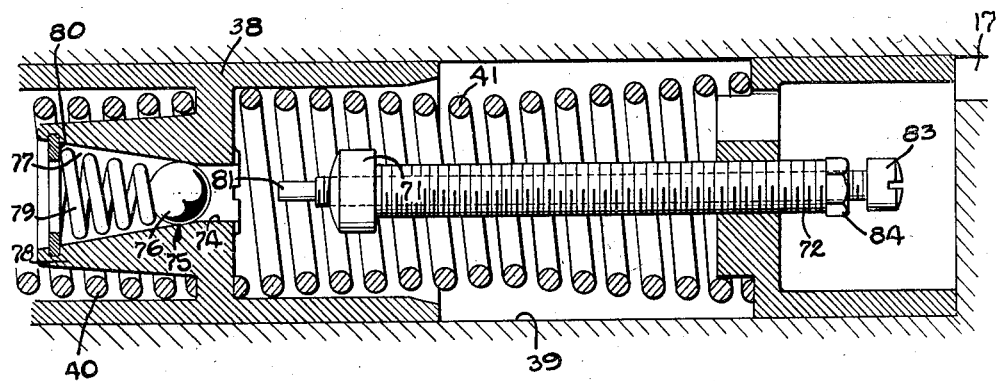
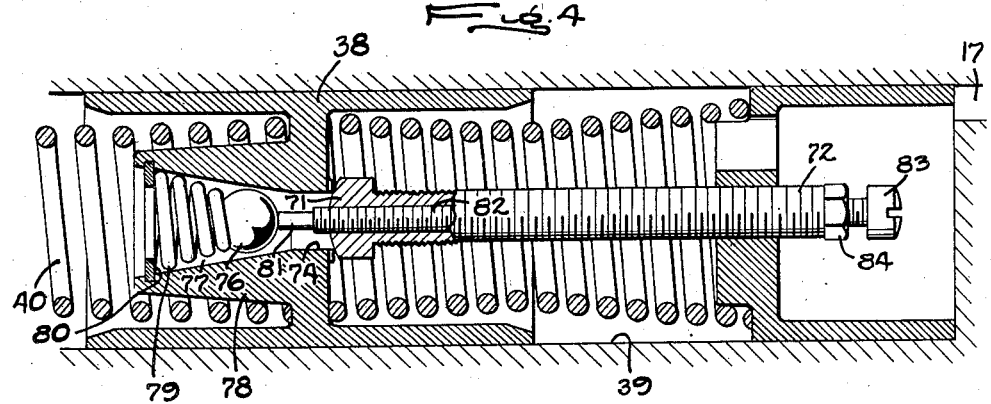
INVENTOR
Willard J. Whitehead
By Carlsen, Pitzner, Hubbard & Wolfe
ATTORNEY

United States Patent Office 2,824,549
Patented Feb. 25, 1958

2,824,549

COMPENSATED SPEED GOVERNOR

Willard J. Whitehead, Rockford, Ill., assignor to Woodward Governor Company, Rockford, Ill., a corporation of Illinois Application November 17, 1955, Serial No. 547,382

7 Claims. (Cl. 121—42)

This invention relates to a speed governor incorporating a so-called compensating or resetting mechanism which, after a correcting action of a power servo is initiated in response to a speed deviation, applies a restoring force to the speed sensing device and then gradually dissipates such force. In certain of its aspects, the invention has more particular reference to a hydraulic governor of the type shown in Patent 2,478,753.

One object of the invention is to provide a compensated speed governor which, when used with a diesel engine having an exhaust turbine driven supercharger, effectually prevents exhaust smoking of the engine following sudden load changes of substantial magnitude.

Another object is to achieve the foregoing object through a simple modification of the patented governor.

The invention also resides in the novel manner of utilizing the patented compensating mechanism to sense sudden and substantial load changes.

A further object is to incorporate in the patent governor a novel means operating in response to sudden load changes to automatically vary the rate of fluid leakage in the compensating system.

Other objects and advantages of the invention will become apparent from the following detailed description taken in connection with the accompanying drawings, in which Figure 1 is a fragmentary sectional view and hydraulic circuit diagram of a speed governor embodying the novel features of the present invention.

Figs. 3 and 4 are enlarged views similar to Fig. 2 showing a modification of the invention.

Figure 1:
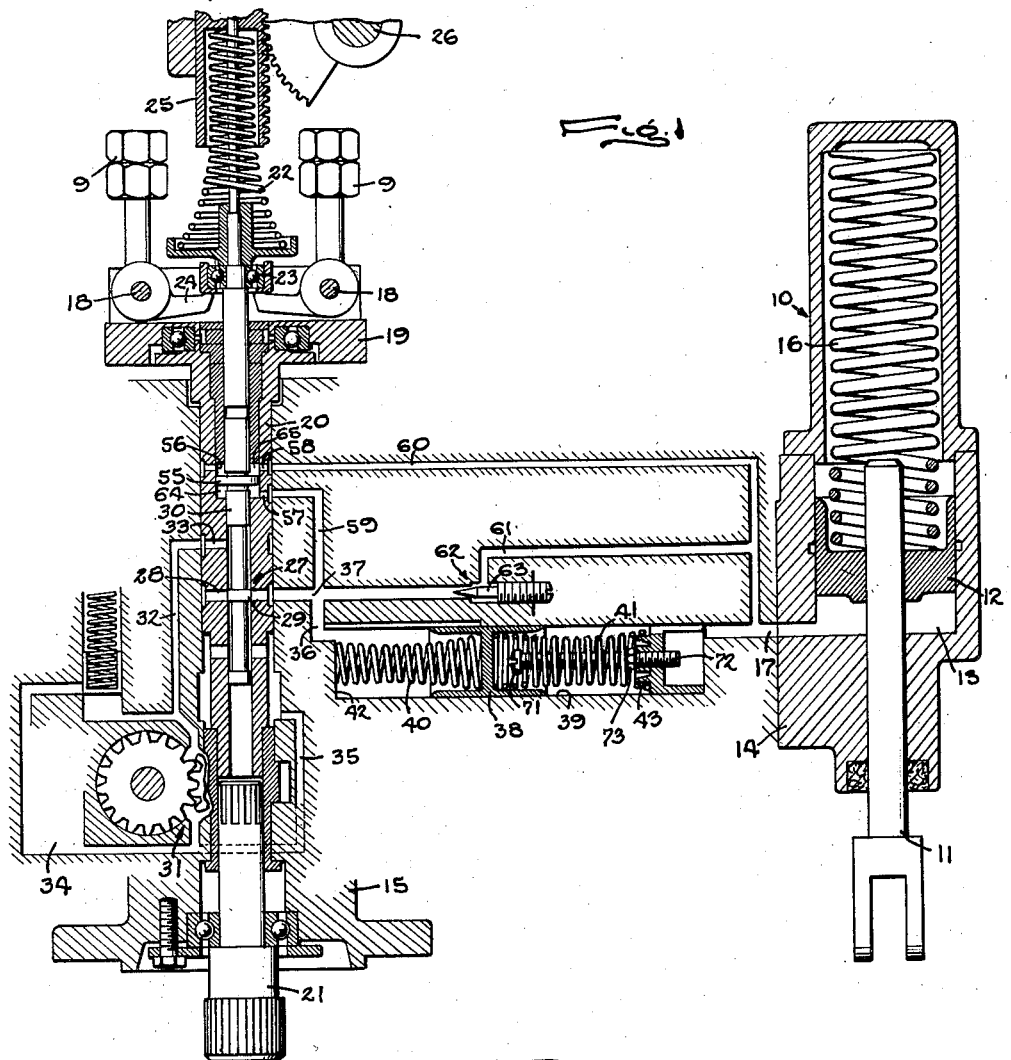

The speed governor shown in the drawings to illustrate the invention is of the hydraulic type in which a force, variable in direction and magnitude with changes in the speed of a prime mover such as a diesel engine (not shown), governors the operation of a servo actuator 10 for positioning a rod 11 connected through a suitable linkage to the fuel regulator or throttle of the engine.

The servomotor shown is of the single acting hydraulic type comprising a piston 12 reciprocable in a stationary cylinder which may be supported within a housing 14 attached to the casing 15 of the governor. The regulator rod 11 is urged in the fuel reducing direction by a spring 16 which is compressed as the servo chamber 13 is expanded by the admission of fluid under pressure to the rod end of the cylinder through a passage 17.

Deviations in the engine speed from the value desired to be maintained may be detected by a speed senser of the flyball type comprising upstanding weights 9 pivoted at 18 on a rotary head 19. The latter is fast on the upper end of a ported sleeve 20 rotatable in a bushing which is supported in the casing 15. The lower end of the sleeve 20 is spline coupled to a shaft 21 driven by the prime mover which is controlled by the governor.

The centrifugal force acting on the flyballs is balanced against a compression spring 22 bearing downwardly against the inner race of a ball thrust bearing 23 whose outer race is engaged by arms 24 of the flyballs. The speed-setting of the governor may be adjusted by manually turning a shaft 26 to shift a member 25 and thereby vary the speeder spring stress.

In the present instance the force derived from changes in the flyball speed is applied mechanically to a valve device 27 having parts which are relatively movable in opposite directions away from a predetermined neutral position in response to opposite deviations of the control force away from a value predetermined by the governor speed adjustment. The valve is formed by ports 28 in the sleeve 20 coacting with a land 29 on a stem 30 which is slidable in the rotating sleeve and is connected at its upper end to the inner race of the bearing 23.

Through a passage 32 and a port 33 in the sleeve 20, oil supplied under substantially constant pressure by a pump 31 is delivered in the sleeve above the land 29. The pump inlet communicates with sump spaces 34, one of which is connected through holes 35 which the interior of the sleeve 20 below the land 29.

Pressure fluctuations in the space 37 to which fluid is delivered or from which it is released when the valve is open are communicated to the servo chamber 13 through the intermediary of a wall in the form of a plunger 38 which moves back and forth as the space pressure changes but which is urged toward and at equilibrium occupies the centered position shown in Fig. 1. The plunger is slidable in a cylinder 39 rigid with the casing 15 and communicating at one end with the space 37 through a passage 36 and at the other end with the servo chamber 13 through the passage 17.

The centering action is produced by two coiled springs 40 and 41 disposed in opposite ends of the cylinder 39 for engagement with opposite ends of the plunger and suitable abutments 42 and 43 at the ends of the cylinder. Under equilibrium conditions, the plunger 38 is centered in its cylinder and the springs 40 and 41 are under some initial compression (Fig. 1).

As described in the aforesaid patent, the transmission of each pressure change from the space 37 to the servo chamber 13 through the intermediary of the spring centered plunger 38 produces a pressure difference which is applied to the control device 27 to derive the desired compensating action or temporary droop so as to provide in the case of a speed governor, true isochronous operation. Herein, the modifying forces are exerted on a piston 55 fast on the valve stem 30 and slidable in a cylinder 56 whose opposite ends communicate through properly restricted ports 57 and 58 with passages 59 and 60 respectively leading to the valve outlet space 37 and the servo chamber 13. A pressure increase in the space 37 due to lowering of the valve stem acts on the lower end of the piston 55 to return to stem 30 to neutral position. Conversely, a reduction in pressure relative to that in the servo chamber 13 resulting from raising of the valve stem, causes a resultant downward pressure on the piston 55.

To dissipate the droop producing force and restore the control point of the system to the desired value so as to provide for true isochronous operation of a prime mover, the passages 59 and 60 are connected through a bypassage 61 having an adjustable restriction 62 therein formed by a needle valve 63. The latter permits the leakage of fluid back and forth between the space 37 and the servo chamber 13 thus dissipating each pressure differential at a rate determined by the setting of the needle valve.

To summarize the operation of the structure thus far described, assume that the parts are disposed in the centered or equilibrium positions shown in Fig. 1. If the load on the engine is increased and the speed thereby decreased, the flyballs will move in, allowing the speeder spring 22 to move the control land 29 downwardly to uncover the ports 28 and permit a flow of pressure fluid to the passage 37 and the left end of the cylinder 39, forcing the plunger 38 to the right against the action of the spring 41 and the lower pressure then prevailing in the servo chamber 13. Fluid is thus forced out of the other end of the cylinder and into the servo chamber 13, and the regulator 11 is moved upwardly to increase the fuel supply.

As an incident to this, the pressure in the lower compensating chamber 64 is increased above that in the upper chamber 65 by an amount proportional to the movement of the plunger 38, resulting in the application to the receiving piston 55 of an upwardly directing restoring force. The drooping characteristic thus produced is maintained by the action of the spring 41 on the piston 38 but starts to dissipate immediately by fluid leakage through the restricted by-pass 62 between the chambers 64 and 65. As the pressure differential decreases, the speed at which a given valve opening is maintained is brought closer to the normal speed setting of the governor, normal speed being restored fully when the pressure differential has been dissipated completely and the plunger 38 has returned to centered position with the servo piston in a position corresponding to the new load on the engine.

If the load decreases resulting in a speed increase, the valve land 29 is raised by the flyballs and the energization of the servo is reduced by movement of the piston 38 to the left against the action of the spring 40. A pressure differential is thus created between the chambers 64 and 65 resulting in the application of a force to the receiving piston 55. As before, the droop thus produced is dissipated by the leakage through the needle valve which is accompanied by restoration of the normal speed of the prime mover when the plunger 38 has again returned to the centered position under the prevailing engine load.

In the automatic controller above described, it will be apparent that there is no direct and unrestricted fluid connection between the valve controlled space 37 and the servo cylinder. Thus, each change in the control pressure results in displacement of the plunger 38 which displacement in turn causes a corresponding change in the pressure on the servo piston. Also, the initial displacement of the plunger is proportional to the detected load change less the leakage through the needle valve 62 while the displacement is progressing.

The present invention takes advantage of these inherent characteristics to provide an extremely simple and reliable mechanism for limiting the rate at which the fuel to the engine may be increased in response to a sudden and large change in load. Such limitation of the fuel increase is desirable when the governor is used to control a diesel engine equipped with a supercharger driven by an exhaust turbine. In such a system, the mass flow of exhaust gases is low with the engine running lightly loaded and the air supplied by the supercharger is correspondingly low. Now, if a large load is placed on the engine, the speed will drop and the governor will quickly call for maximum fuel while the supercharger is running at low speed. As a result, the mass flow of air to the engine is insufficient for proper combustion of maximum fuel and objectionable exhaust smoking results.

In accordance with the present invention this condition is overcome by the provision of a stop 71 positioned to interrupt the outward movement of the plunger 38 in the fuel increase direction at a point short of the normal range and corresponding approximately to the maximum fuel rate which the supercharged engine is capable of consuming when operating at low speed. In the form shown in Figs. 1 and 2, the stop comprises the head of a screw 72 disposed within the coil of the spring 41 and threaded into the plug 43 at the end of the cylinder 29. By turning the screw, its head may be spaced a desired distance from the plunger 38 when the latter is in normal centered position as shown in Fig. 1, the selected adjustment being maintained by a lock nut 73.

Figure 2:
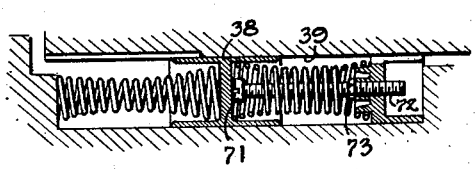
Fig. 2 shows a portion of Fig. 1 in a moved position of the parts.

When equipped with the stop 71, the governor operates in the normal way in response to small or slow load changes or movements of the engine throttle which are too small to cause the plunger 38 to move far enough to engage the stop 71. However, when the plunger, in response to a sudden load change of substantial magnitude, moves far enough to engage the stop, as shown in Fig. 2, further movement of the plunger and transfer of the increased pressure to the servo cylinder is interrupted leaving the by-passage 61 with the restriction 62 therein as the only available path through which the pressure may be transferred to the servo chamber. At the same time, the relatively large pressure change in the space 37 caused by the large load change is applied directly to the compensating receiving piston 55 in a direction to restore the pilot valve quickly to center position. These combined actions thus establish the maximum rate of fuel increase at a value such as to permit the slowly accelerated turbo supercharger to supply enough air for proper combustion of the available fuel. As normal operating conditions are restored, the plunger 38 moves back away from the stop toward its equilibrium position.

With the arrangement shown in Fig. 1, the rate at which the fuel may be increased in response to sudden load changes is determined by the leakage through the needle 62 which of course is adjusted to provide most effective compensating action for a given engine being controlled. While the by-passing of pressure fluid to the servo cylinder will not ordinarily result in objectionable limiting of the fuel rate increase under normal conditions after the plunger 38 has engaged the stop 71, it is usually desirable to provide a wider selection of maximum rates of fuel flow. For this purpose, provision is made for by-passing the pressure fluid between the valve space 37 and the servo cylinder 39 through a separate connection which is adjustable selectively according to the requirements of a given engine and independently of the needle valve 63 or the position of the stop 71. At the same time, provision is made for opening the auxiliary by-pass automatically and substantially simultaneously with the detection of the objectionable load change as evidenced by engagement of the plunger with the stop 71.

To these ends, the compensating system above described is modified as illustrated in Figs. 3 and 4. The auxiliary by-passage preferably extends through a hole 74 in the plunger 38 itself and is adapted to be controlled by a valve 75 responsive to movement of the plunger into and out of engagement with the stop 71. Herein, the hole is alined axially with the stop 71 and the valve includes a ball 76 disposed in a recess 77 defined by a hollow flange 78 on the plunger and flaring outwardly and away from the hole 74 with which the recess is alined axially. A spring 79 acting in compression against an abutment 80 urges the ball to a normal position in its seat as shown in Fig. 3. With the valve thus closed the auxiliary by-pass is ineffective.

To shift the ball away from its seat in proper timed relation to the engagement of the plunger and the stop 71, a second stop 81 is disposed within the spring coil 41 and set inwardly beyond the stop 71 so that, in the fuel-increasing movement of the plunger, the stop 81 will engage the ball 76 and open the valve 75 as shown in Fig. 4 just before the plunger reaches the stop 71. When the stop 71 is finally engaged by the plunger, the valve will be opened far enough to provide for the desired additional by-pass of the pressure fluid.

As shown, the screw 72 supporting the first stop 71 is made in the form of a tube threaded internally to receive a screw 82 carrying the stop 81. The latter is adjustable axially relative to the stop 71 by turning a head 83 on the outer end of the screw 82 which is then locked in adjusted position by a nut 84.

In operation, the valve 75 remains closed during normal operation of the engine, the needle valve 63 being set to provide most effective compensating action. When the load on the engine increases sufficiently to cause the plunger 38 to approach the stop 71, the ball 76 will encounter the stop 81 and be moved away from its seat (Fig. 4) just before the motion of the plunger is arrested by the stop 71. Because of the taper of its seat, the final opening of the valve will be determined by the spacing of the stop 81 relative to the stop 71. Such spacing, for any selected position of the stop 71, is variable selectively by adjustment of the screw 82. By such adjustment, the by-passing of the pressure fluid by the combined action of the valves 62 and 75 may be at any rate desired so as to limit correspondingly the rate at which the fuel may be increased. In this way, the fuel limiting action produced by the stop 71 may be correlated accurately with the characteristics of both the engine and its supercharger without detracting from the effectiveness of the compensating system under normal operating conditions.

I claim as my invention:

1. A speed governor having, in combination, a fluid servo having an expansible chamber and a member closing the chamber and adapted for association with a prime mover to increase and decrease the speed thereof in response to opposite movements of said member, a fluid space, a fluid passage extending between said chamber and said space, a partition wall in said passage separating said space and chamber and movable in opposite speed-increasing and speed-decreasing directions away from a centered position to transmit to said chamber changes in the pressure in said space, a by-passage connecting said space and chamber and having a restriction permitting slow leakage of fluid between the two, speed sensing means including a valve for admitting pressure fluid to or releasing the same from said space, means responsive to the pressure differentials built up between said space and chamber and operable to apply each differential to said valve to return the same toward neutral position, two springs both continuously acting on said wall in all positions of the latter and exerting equal and opposite forces on the wall when the latter is in said centered position, a fixed stop disposed in the path of movement of said wall and adapted to stop the same after a limited movement thereof in the speed increasing direction away from said centered position, and means mounting said stop for adjustment along said path to vary the position of interception of said wall.

2. A speed governor having, in combination, a fluid servo having an expansible chamber and a member closing the chamber and adapted for association with a prime mover to increase and decrease the speed thereof in response to opposite movements of said member, a fluid space, a fluid passage extending between said chamber and said space, a partition wall in said passage separating said space and chamber and movable in opposite speed-increasing and speed-decreasing directions away from a centered position to transmit to said chamber changes in the pressure in said space, a by-passage connecting said space and chamber and having a restriction permitting slow leakage of fluid between the two, speed sensing means including a valve for admitting pressure fluid to or releasing the same from said space, means responsive to the pressure differentials built up between said space and chamber and operable to apply each differential to said valve to return the same toward neutral position, two compression springs disposed in said passage in end to end relation with opposite ends abutting opposite sides of said wall so as to move therewith at all times and exert oppositely directed forces thereon, and a fixed stop disposed in the path of movement of said wall and adapted to engage the same and interrupt the speed increasing movement of the wall after a limited movement of the latter away from said centered position.

3. Speed regulating apparatus having, in combination, a fluid servo having an expansible chamber, a fluid space, a passage extending between said chamber and said space, a partition wall movable along said passage and separating said space and chamber, a by-passage connecting said space and chamber and having a restriction permitting slow leakage of fluid between the two, a speed senser including a valve controlling the admission of pressure fluid to or the release of the same from said space, two springs acting on said wall and respectively operating to resist movement of the wall in opposite directions away from a centered position, a fixed stop disposed in said passage and engageable by said wall to stop the latter after limited movement thereof in one direction away from said centered position, a second by-passage between said space and chamber having a normally closed valve therein, and means responsive to the movement of said plunger and operable to open said valve as said plunger comes against said stop.

4. Speed regulating apparatus as defined in claim 3 including selectively adjustable means for varying the degree of said valve opening and thereby the rate of fluid flow through said second by-passage.

5. Speed regulating apparatus as defined in claim 3 in which said second by-passage comprises a hole extending through said walls and said valve is carried by the wall.

6. Speed regulating apparatus having, in combination, a fluid servo having an expansible chamber, a fluid space, a passage extending between said chamber and said space including a cylinder, a plunger slidable in said cylinder and separating said space and chamber, a by-passage connecting said space and chamber and having a restriction permitting slow leakage of fluid between the two, a speed senser including a valve controlling the admission of pressure fluid to or the release of the same from said space, two coiled springs disposed in opposite ends of said cylinder and respectively operating to resist movement of said plunger in opposite directions away from a centered position, a fixed stop disposed in said cylinder and engageable by said plunger to stop the latter after limited movement thereof in one direction away from said centered position, means supporting said stop for adjustment along said cylinder, a second by-passage connecting said space and said chamber including a hole extending through said plunger, a normally closed valve controlling the opening and closing of said hole and having a member mounted on said plunger and movable relative thereto away from said stop to open the valve, said member facing toward said stop, and a second stop positioned for engagement by said member as said plunger comes into engagement with said first stop.

7. Speed regulating apparatus as defined in claim 6 in which said valve comprises a conical seat alined with said hole and said second stop and a ball spring urged into the seat and engageable by said second stop after the latter has entered said hole in the final movement of the plunger.

References Cited in the file of this patent
UNITED STATES PATENTS
2,756,725   Parker _____ July 31, 1956